UNITED STATES PATENT OFFICE.

GEORGE T. LEWIS, OF PHILADELPHIA, PENNSYLVANIA.

PROCESS OF MANUFACTURING LEAD PIGMENT.

SPECIFICATION forming part of Letters Patent No. 437,701, dated October 7, 1890.

Original application filed July 8, 1889, Serial No. 316,843. Divided and this application filed June 16, 1890. Serial No. 355,661.
(No specimens.)

*To all whom it may concern:*

Be it known that I, GEORGE T. LEWIS, a citizen of the United States, residing at Philadelphia, county of Philadelphia, and State of Pennsylvania, have invented a new and useful Improvement in the Process of Manufacturing Pigment, of which the following is a full, clear, and exact description.

This application is a division of an application filed July 8, 1889, Serial No. 316,843.

Sublimed lead is a white pigment consisting, mainly, in sulphate, sulphite, and oxide of lead. This is manufactured either directly from galena ore (native lead sulphide) or indirectly from this. In the first case galena is exposed to the joint action of heat and a current of air, whereby it is changed into fumes. In the last case the ore is first smelted so as to smelt down into the metallic state a large portion of the lead, together with any precious metals, and the slag and fumes from this treatment are then treated to produce the white pigment. As galena generally contains zinc, very often in large quantities, the pigment is not a pure lead pigment. This is particularly the case where the pigment is made indirectly from galena ore, as in this case the zinc remains in slag and fumes, while part of the lead smelts down and the pigment from this slag and fumes will contain much zinc. Now, blende when sublimed forms a very inferior pigment. It is exceptional as far as color goes; but it has a tendency to harden oil when ground in this for a paint. The pigment from zinciferous lead ore will, to a certain extent, have the same fault, and to overcome this I wash the pigment in water acidulated with sulphuric acid or with a solution of sulphurous acid. This dissolves the zinc, which may now be precipitated again by an alkali or an alkaline carbonate in such a state that it will no longer harden the oil; or, to prepare a pure pigment, the solution may be separated from the lead salts. The pigment is now dried, preferably after first pressing the water out in a filter-press, by which treatment a denser mass is obtained.

Having now fully described my process, what I claim, and desire to protect by Letters Patent, is—

The process of purifying sublimed lead pigments containing zinc, which consists in mixing the pigment with acidulated water containing sulphuric or sulphurous acid, then separating the soluble from the insoluble residue, and then drying said residue.

In testimony of which invention I have hereunto set my hand.

GEORGE T. LEWIS.

Witnesses:
H. B. RIANHARD,
WM. FISHER LEWIS.